United States Patent [19]

Carman et al.

[11] 4,347,715
[45] Sep. 7, 1982

[54] GEAR TYPE COUPLING WITH OVERLOAD PROTECTION

[75] Inventors: Kenneth K. Carman, Ellicott City; Stanley G. Webb, Severna Park, both of Md.

[73] Assignee: Koppers Company, Inc., Pittsburgh, Pa.

[21] Appl. No.: 218,876

[22] Filed: Dec. 22, 1980

Related U.S. Application Data

[62] Division of Ser. No. 952,628, Oct. 19, 1978, abandoned.

[51] Int. Cl.³ ............................ F16D 3/18; F16D 3/56
[52] U.S. Cl. .......................................... 464/32; 285/2; 464/154
[58] Field of Search ................ 64/28 R, 9 R, DIG. 1; 285/2; 403/2, DIG. 3

[56] References Cited

U.S. PATENT DOCUMENTS

| | | | |
|---|---|---|---|
| 3,132,494 | 5/1964 | Hoffer | 64/9 R |
| 3,298,198 | 1/1967 | Winkler | 64/9 R |
| 3,673,814 | 7/1972 | Carman | 64/9 R X |
| 3,757,535 | 9/1973 | Stein | 64/9 R |
| 3,775,997 | 12/1973 | Carman | 64/9 R |
| 3,982,408 | 9/1976 | Wright | 64/9 R |
| 3,999,404 | 12/1976 | Banki et al. | 64/9 R X |

*Primary Examiner*—Stanley N. Gilreath
*Attorney, Agent, or Firm*—Thomas L. Sivak; Oscar B. Brumback

[57] ABSTRACT

An improved gear type coupling wherein the sleeve thereof is a torsional shear element to provide torsional overload protection to the coupling and its connected equipment. The shear section of the shear element is an integral part thereof and all sections of the shear element conduct an equal share of the transmitted torque.

2 Claims, 2 Drawing Figures

U.S. Patent  Sep. 7, 1982  4,347,715
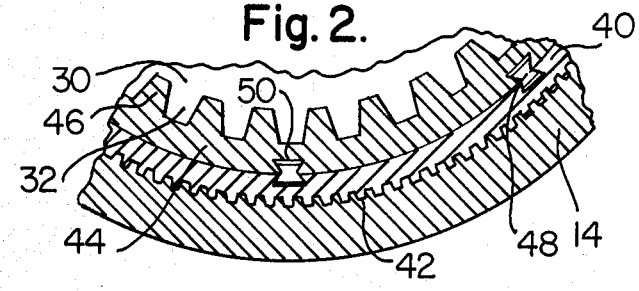
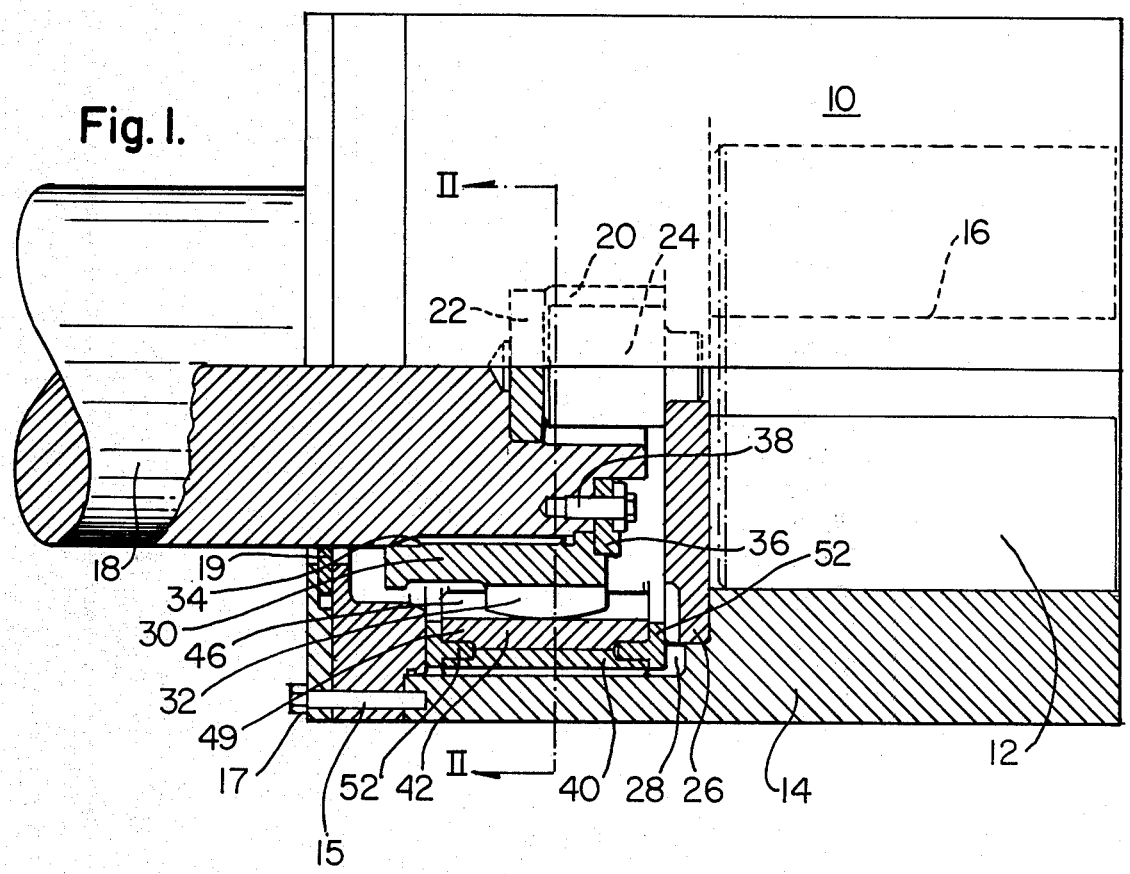

GEAR TYPE COUPLING WITH OVERLOAD PROTECTION

This is a division, of application Ser. No. 952,628, filed Oct. 19, 1978, now abandoned.

BACKGROUND OF THE INVENTION

1. Field of the Invention

This invention relates to gear type couplings and, more particularly, to spindle couplings of the type used in connecting a powered prime mover to the rolls of a rolling mill as well as to like apparatus.

2. Description of the Prior Art

Generally, gear coupling of the spindle type such as those used in rolling mills include a coupling sleeve at each end of a spindle shaft. The sleeve at the driving end of the spindle shaft connects drivingly to a powered prime mover or a pinion stand and at the driver end of the shaft the sleeve connects to the spade end of a roll in the rolling mill. During operation excessive torsional stresses can be encountered that will lead to expensive and extensive damage to either the driving machinery or the rolling mill. These excessive torsional stresses can also lead to a catastrophic failure of the coupling itself, causing additional damage to both the driving machinery and the rolling mill as well as requiring a complete replacement of the coupling. U.S. Pat. No. 3,999,404 discloses one type spindle coupling which provides torque overload protection. While the disclosure of U.S. Pat. No. 3,999,404 does provide torque overload protection, the design requires that the shear element be mounted on the shaft and that mating and coacting surface of the shaft and shear sleeve be specially shaped to provide freedom of movement for the sections of the shear sleeve in the event of a torque overload.

Accordingly, the objects of the present invention include a more easily accessible shear element in that the hub of the shaft need not be disturbed in the event of a torque overload and a shear element that does not require special mating faces between the shaft and shear element.

SUMMARY OF THE INVENTION

These and other objects of the present invention are achieved by providing a spindle coupling in which the sleeve is the torsional shear element. The shear section of the shear element is fixed to the sleeve for rotation therewith. The shear section is of reduced cross-sectional area and radial and axial clearances are provided to provide for a non-uniform break.

BRIEF DESCRIPTION OF THE DRAWINGS

FIG. 1 is an elevational view, partly in section, of the driving end of a spindle coupling including the shear element of the present invention;

FIG. 2 is an elevational view, partly in section, taken along line II-II of FIG. 1.

DESCRIPTION OF THE PREFERRED EMBODIMENT

Referring to FIG. 1, the driving end of a spindle coupling 10 has a driving shaft 12 to which a sleeve 14 is fixed for rotation therewith through keyway 16. Shaft 18 known in the art as a floating shaft, has a cavity 20 which is adapted to receive shaft thrust button 22 and thrust button 24. Shaft button 22 coacts with thrust button 24 which engages and coacts with thrust plate 26 secured in the conventional manner in cavity 28 of the driving end sleeve 14. Abutting the end of sleeve 14 is end ring 15 which is fixed to sleeve 14 by bolts 17. An end ring plate is bolted to ring 15 and a seal ring 19. Surrouding the end of shaft 18 is flex hub 30 which includes a plurality of gear teeth 32. Hub 30 is splined to shaft 18 at 34 and is retained in position by means of a hub ring 36 and bolt fasteners 38.

Sleeve 14 includes an external intermediate sleeve 40 which is fixed for rotation therewith through spline 42. Internal intermediate sleeve 44 includes a plurality of conventional straight intermdiate gear teeth 46 which mesh and coact with gear teeth 32. A plurality of shear key connections 48 are retained in keyway 50 between internal and external intermediate sleeves 40 and 44. In operation, torque is transmitted from driving shaft 12 through sleeve 14 to intermediate sleeve 40 through shear keys 48 to intermediate sleeve 44 and teeth 46 to hub 30 to shaft 18. If the torque exceeds a predetermined amount, shear keys 48 will shear and the torque transmission from driving shaft 12 to coupling shaft 18 will be interrupted, thus preventing any overload damage to the driving or driven machinery. Radial and axial clearance is provided for shear pin connections 48 in keyway 50 to compensate for uneven breaks in keys 48. Support bearings 52 are provided to maintain relative rotation sleeves 40 and 44. Bearing 52 also minimizes bending moments of pins 48 during normal operation. It is understood that the opposite end of shaft 18 is also engaged to a driven shaft not illustrated in the same manner as it is to shaft 12 as typified in U.S. Pat. No. 3,673,814.

While we have described certain preferred embodiments of our invention, it will be understood that it mat be otherwise embodied within the scope of the following claims.

What is claimed:

1. In a gear coupling comprising a floating shaft, hubs fixed to said floating shaft at each end thereof, said hubs having a plurality of outwardly extending gear teeth, and sleeve means having an inner axial bore operably connecting each of said hubs to a driving shaft and a driven shaft, respectively, the improvement comprising:
    (a) first external intermediate sleeve element having its inner surface fixed to said inner axial bore of each of said sleeve means, said inner surface of said external intermediate sleeve element having shear connection receiving means;
    (b) second internal intermediate sleeve element having an inner axial bore and an outer surface, said inner axial bore having a plurality of gear teeth adapted to mesh and coact with said gear teeth of a respective hub, said outer surface of said internal intermediate sleeve element having shear connection receiving means;
    (c) bearing means operably engaging and supporting said first and second intermediate sleeve elements; and
    (d) shear connection means received in and retained by said receiving means in said external and internal intermediate sleeve elements, said shear connection means adapted to transmit a predetermined amount of torque between said elements.

2. The gear coupling of claim 1 wherein said shear connection is a key means.

* * * * *